UNITED STATES PATENT OFFICE 2,446,687

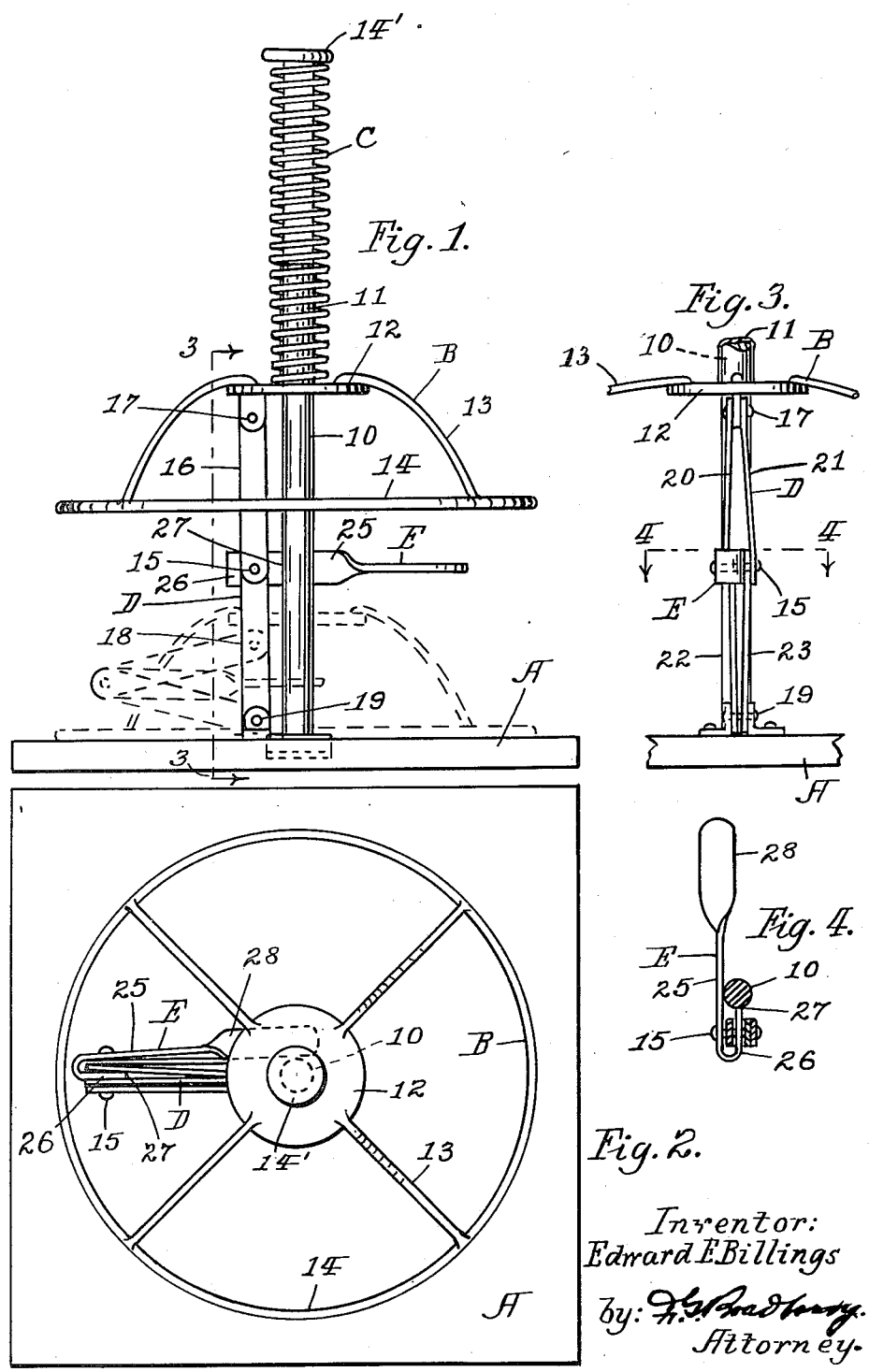

TRAP

Edward E. Billings, Los Angeles, Calif.

Application May 8, 1946, Serial No. 668,042

1 Claim. (Cl. 43—79)

This invention relates to improvements in animal traps, an object being to provide a trap which is especially designed to catch rats, mice, squirrels, snakes and other animal life. Another object is the production of a trap which will without fail kill the animal irrespective of the direction of approach thereby reducing suspicion. Another object is the production of a trap which can be easily set by the user without danger of bodily harm. Among still further objects are maximum simplicity of construction together with greater effectiveness in use.

In the accompanying drawing forming part of this specification, Fig. 1 is a side elevation of my improved trap, the full line position showing the trap set for use and the broken line position showing the trap when it has been sprung; Fig. 2 is a plan showing the trap in sprung position; Fig. 3 is an edge elevation of a detail portion of the structure shown in full line position as indicated by the line 3—3, Fig. 1; and Fig. 4 is a section of a detail taken on the line 4—4 of Fig. 3.

In the drawing, A represents a rigid base which may be made out of any suitable material and in any shape desired. Mounted rigidly near its median portion is an upright shaft or post 10. Arranged to slide vertically on the shaft is a plunger frame B. This plunger frame has a supporting hub which is a sleeve 11. This sleeve slides freely on the shaft and is formed on its lower end with an outstanding annular flange 12. Secured rigidly to this flange are a plurality of circumferentially spaced downwardly curved radiating supporting arms 13. A strong and rigid ring 14 arranged concentrically about the axis of the shaft is secured in horizontal position to the outer ends of these arms. This plunger frame is arranged to assume superior position sufficiently spaced above the base to permit the animal to enter below. It is adapted to slide downwardly against the base so as to pin an animal on the base by the ring.

A helical expansion spring C threaded freely over the shaft and the sleeve upon the shaft is interposed longitudinally between the flange 12 and stop 14' on the upper end of the shaft and is adapted to urge the plunger frame B downwardly with sufficient force to pin and kill an animal which approaches on the base below the ring.

A catch or latch D is provided which holds the plunger in raised position as shown by full lines in Fig. 1. This catch is composed of two link members hinged endwise together by the pintle 15, one link member 16 being hinged at its end to the flange 12 by the pintle 17 and the opposite link member 18 being hinged to the base by the pintle 19. The link member 16 is composed of two arms 20 and 21 and the link member 18 is composed of two arms 22 and 23 which distribute the force for supporting the plunger frame B evenly in set position so that the catch can be easily released without sticking.

When the plunger frame is raised against the tension of spring C and assumes upward set position the link members 16 and 18 extend apart and assume substantially aligned position longitudinally substantially parallel with the axis of shaft 10. In this position a trigger E which is pivotally secured by the pintle 15 to the joint between the adjacent ends of the link members 16 and 18, extends laterally and in cooperation with the side of shaft 10 limits the link members from buckling in one direction. The trigger E is a cam arm 25, one end of which is reversed and forms an arm 26 having a stop shoulder 27. The other end is formed with a broad pallet 28 to which bait may be attached for attracting an animal into the trap. The end of the stop arm having the cam shoulder is pivotally secured by pintle 15 to the joint between the ends of the catch members and when the trap is set with the stop shoulder 27 abutting against the side of the shaft 10 the trigger is sustained substantially in outstanding position. When an animal presses the trigger by contact with the pallet end portion the cam shoulder breaks the joint between the connected ends of the catch and releases the plunger, whereupon the spring C forces the plunger downwardly towards the base. In this manner the plunger will catch the animal.

It will be noted that the plunger is a skeleton frame bounded by a rigid marginal animal striking or impact ring 14 which is disposed in a normal horizontal plane and concentric about the shaft. This ring so arranged is adapted to impinge an animal on the base in any direction from which the animal approaches the trap. Also in setting the trap the plunger can be elevated and the catch will automatically prop the plunger in set position without danger of the hands of the operator being caught and injured.

Various modifications in construction are contemplated within the spirit of the invention and the scope of the following claim.

I claim:

A trap comprising a base, an upwardly extending shaft on said base, a plunger reciprocable on said shaft, an actuating spring on said shaft normally urging said plunger downwardly upon said base, a catch movably connected by its end portions to said plunger and base and having a joint between its ends permitting it to fold from the extended position and adapted when extended to support said plunger elevated above said base in set position, and a trigger hinged to said joint and having an outwardly extending trip arm and a stop co-operating with the side of said shaft to break said joint and release the catch by the movement of said trip arm.

EDWARD E. BILLINGS.

REFERENCES CITED

The following references are of record in the file of this patent:

UNITED STATES PATENTS

| Number | Name | Date |
|---|---|---|
| 16,335 | Jillson | Jan. 6, 1857 |
| 937,360 | Cole | Oct. 19, 1909 |

FOREIGN PATENTS

| Number | Country | Date |
|---|---|---|
| 191,038 | Germany | May 22, 1906 |